United States Patent Office 3,463,648
Patented Aug. 26, 1969

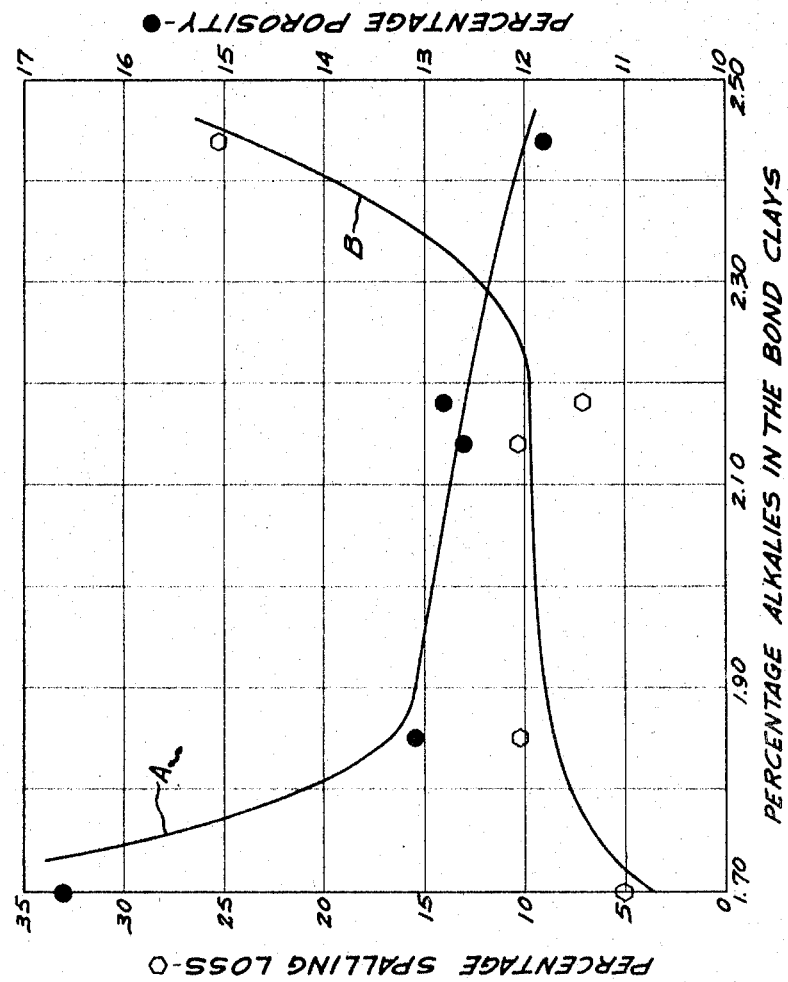

3,463,648
LADLE BRICK
Clyde L. Thompson, Pittsburgh, Pa., assignor to Dresser Industries, Inc., a corporation of Delaware
Filed Nov. 7, 1966, Ser. No. 592,522
Int. Cl. C04b 35/68, 35/10
U.S. Cl. 106—65                                    5 Claims

ABSTRACT OF THE DISCLOSURE

The present invention relates to a ladle brick of the high alumina class, i.e., including more than 50% $Al_2O_3$, of carefully controlled bond-clay chemistry.

---

This invention relates to burned, high alumina, refractory brick for lining ladles and, more particularly, to burned, high alumina refractory brick for lining steel ladles.

Steel is manufactured in large furnaces, usually basic oxygen furnaces or open hearth furnaces. The molten steel is tapped from these furnaces at about 2900° F. into ladles usually referred to as transfer ladles. While the molten steel is in these ladles, it is often alloyed by the addition of various alloying materials. Thereafter, the steel is either poured directly into ingot molds or into smaller ladles from which it is poured into ingot molds. Where continuous casting machines are used, the molten steel is usually poured from the transfer ladle into a tundish ladle from which it is poured into the continuous casting apparatus. As can be seen, transfer ladles are a very crucial part of the steelmaking process.

Transfer ladles are typically lined with refractory brick. The primary requirements for ladle brick are that they have high density and low porosity. The porosity should preferably be between 8 and 12%. Ladle brick should have suitable refractoriness, that is, resistance to high temperatures. Low porosity and good refractoriness are the properties which enable ladle brick to resist the corrosive action of steel making slags usually present in come quantity in any transfer ladle. It is also necessary that ladle brick have good thermal shock resistance, i.e., they can be heated very rapidly without spalling.

Ladles are usually preheated to about 2000° F. before being charged with molten metal. Therefore, the hot face of the ladle brick may be subjected to a 900° F. increase in temperature in a very short period of time. It is crucial that ladle brick do not shrink or heat-up, but preferably slightly expand at steelmaking temperatures. The expantion desired is not reversible thermal expansion but a permanent expansion due to a slight growth of the brick. These then are the primary requirements for ladle brick.

Traditionally, ladle brick have been made from shales and bloating-type clays which are very inexpensive and tend to expand as much as 20% in service. With the introduction of the newer steelmaking processes (for example, the basic oxygen furnaces and, especially, continuous casting), the temperature of the hot metal contained in transfer ladles is somewhat increased, and the length of time the hot metal remains in the ladle is increased. Under such circumstances and conditions, the typical bloating-type ladle brick is not satisfactory. There is a current trend to replace the bloating-type ladle brick with high alumina refractories in an attempt to extend lining life and reduce inclusions in steel castings.

Typically, the high alumina products which are offered for ladle lining are made by "sweetening" shales or bloating-type clays with bauxite or other high alumina additions. In "sweetened" refractories, the low-melting matrix remains the weak link permitting fast erosion whether or not there are bauxite grains present. Furthermore, the free alumina present in bauxites tends to react with the siliceous matrix to form mullite. This reaction is expansive and tends to detrimentally open up the brick structure.

It is therefore an object of this invention to provide a high alumina brick for use in steelmaking ladles which has a matrix resistant to erosion and slag attack, low porosity, good thermal shock resistance, and a small but positive expansion on reheating. A specific goal was to provide such a balance between porosity and spelling resistance such that porosity would be less than about 13%, while spalling loss in the standard ASTM test would not exceed about 10%.

Briefly, according to one aspect of this invention, there is provided a fired, high alumina, refractory brick or shape made from a size graded batch comprising from 60 to 80%, by weight, of a high alumina material and from 20 to 40%, by weight, of a bond clay. The high alumina material should contain from 55 to 70% alumina, and less than about 0.2% alkalies, by weight, based on an oxide analysis. The bond clay should contain from 1.9 to 2.3% alkalies, by weight, based on a calcined oxide analysis. Preferably, the alkalies in the bond clay should range from about 2.0 to 2.2% and, typically, the alkali content is about 2.1%. The total alumina content of the fired high alumina shape should be in excess of about 50%. Preferably, the high alumina material is sized so that about 50 to 80% is −4 +65 mesh, and 20 to 50% is −65 mesh. The bond clay is substantially all −65 mesh.

Further features and other objects and advantages of this invetnion will become apparent from a study of the following detailed description with reference to the drawing, which is a graph demonstrating the relationship between the alkali content of the bond clay and the porosity and spalling resistance of brick made according to this invention.

Five exemplary batches were prepared containing 70% bauxitic kaolin and 30% bond clay, each having different alkali content. The batches were tempered with about 4 to 5% water in a Müller-type mixer. The tempered batch was then pressed into brick at about 5000 to 10,000 p.s.i. The brick were dried at about 250° F. for ten hours and, thereafter, burned in a tunnel kiln at cone 15. The bond clays were selected and mixed so that their alkali contents would vary over a range from about 1.7 to about 2.5%.

The alkali content of the bond clays was calculated. Each batch contained 70% of a calcined bauxitic kaolin having a typical alkali content of 0.1%, this amounting for 0.07% alkalies; thus to calculate the alkali content of the bond clay it was only necessary to subtract the 0.07% from the analysed total of alkalies in the batch (0.58% in Example I), and to divide by 0.3 which is the proportion of the batch constituted by the bond clay. The result was 1.7% for Example I, and otherwise as shown in Table I.

The typical alkali content of the bauxitic kaoline used in this work is given in Table III as 0.10%. Experience shows that the actual alkali content varies (excluding extremes) from below about 0.08% to above about 0.12%. This possible variation in actual alkali content of the bauxitic kaolin would have small effect on the calculated alkali content of the bond clays.

The brick were then tested for bulk density, apparent porosity, reheat expansion, and spalling resistance. The results of these tests along with the chemical analysis of the brick are given in Table I.

In Table I, Examples II, III and IV are according to this invention, that is, the alkali content of bond clays is maintained at a level such that the porosity of the brick is below about 13% and the spalling loss is below about 10%.

TABLE I

| Example No. | I | II | III | IV | V |
|---|---|---|---|---|---|
| Mix, percent: | | | | | |
| Calcined bauxitic kaolin | 70 | 70 | 70 | 70 | 70 |
| Bond clays | 30 | 30 | 30 | 30 | 30 |
| Percentage alkali in bond clays calculated | 1.70 | 1.83 | 2.13 | 2.17 | 2.43 |
| Bulk density, pcf [1] (av. 15–20) | 148 | 153 | 152 | 151 | 153 |
| Apparent porosity (av. 3), percent [2] | 16.6 | 13.1 | 12.6 | 12.8 | 11.8 |
| Reheat test, 2,910° F. (av. 3) [3] volume change, percent | +0.4 | +2.1 | +2.5 | +1.4 | +4.9 |
| Loss in panel spalling test [4] with preheat at 3,000° F. (av. 6–7), percent | 4.9 | 10.3 | 10.4 | 7.1 | 25.2 |
| Chemical analysis, percent: | | | | | |
| Silica ($SiO_2$) | 42.9 | 44.3 | 45.3 | 44.7 | 45.7 |
| Alumina ($Al_2O_3$) | 52.5 | 51.0 | 49.6 | 50.5 | 49.0 |
| Titania ($TiO_2$) | 2.4 | 2.2 | 2.2 | 2.3 | 2.4 |
| Iron oxide ($Fe_2O_3$) | 1.3 | 1.5 | 1.7 | 1.4 | 1.6 |
| Lime (CaO) | 0.32 | 0.13 | 0.11 | 0.38 | 0.17 |
| Magnesia (MgO) | 0.32 | 0.25 | 0.38 | 0.38 | 0.32 |
| Alkalies ($K_2O, Na_2O, Li_2O$) | 0.58 | 0.62 | 0.71 | 0.72 | 0.80 |

[1] Standard methods of test for size and bulk density of refractory brick ASTM Designation C134–41.
[2] Standard methods of test for apparent porosity, ASTM Designation C20–46.
[3] Standard methods of test for reheat change of refractory brick, ASTM Designation C113–61.
[4] Standard method of panel spalling test for super duty fireclay brick, American Society For Testing and Materials (ASTM) Test Designation C122–52.

Table I establishes that there is a critical alkali content permissible in the bond clays in the high alumina brick made according to this invention, to achieve porosity of less than about 13%, together with good thermal shock resistance indicated by spalling loss of about 10% or less. The drawing is a graph on which the apparent porosities and percentage loss in the panel spalling test for the exemplary mixes are plotted against the alkali content in their bond clays. Line A represents porosity and should be read from the right hand scale. Line B represents spalling loss and should be read from the left hand scale. The graph indicates that the alkalies should be limited to between about 1.90 and 2.30% in bond clays. If the alkali content is less, the porosity is rapidly increased. On the other hand, if the alkali content of the bond clay exceeds 2.30%, the loss in the spalling test is rapidly increased. Therefore, it is critical that the alkali content of the bond clay range between 1.90 and 2.30%.

The typical size grading for refractory batches according to this invention are given in Table II.

TABLE II

| | Percent |
|---|---|
| Pass 4 held on 10 mesh | 10–20 |
| Pass 10 held on 28 mesh | 25–35 |
| Pass 28 held on 65 mesh | 5–15 |
| Pass 65 mesh | 45–55 |
| Pass 150 mesh | 34–45 |

Suitable high alumina materials for use in the practice of this invention include calcined Alabama bauxite, calcined bauxitic kaolin, calcined Indian Kyanite and synthetic mullite grain. The typical chemical analyses of these materials are given in Table III below. The difference between calcined Alabama bauxite and synthetic mullite grains is not apparent from their chemical analyses, but pertains to the extent of the mineral-mullite developed. Mineralogically speaking, Alabama bauxite is about 40 parts kaolinite and 60 parts gibbsite. Bauxitic kaolin is about 30 parts gibbsite and 70 parts kaolinite. Other high alumina materials are suitable as long as they contain from 55 to 75% $Al_2O_3$ and less than 0.2% alkalies.

TABLE III.—HIGH ALUMINA MATERIALS

| | Percent | | |
|---|---|---|---|
| | Calcined Alabama bauxite | Calcined bauxitic kaolin | Mullite grain |
| Silica ($SiO_2$) | 21.0 | 37.0 | 21.4 |
| Alumina ($Al_2O_3$) | 75.0 | 59.9 | 74.7 |
| Titania ($TiO_2$) | 2.6 | 2.0 | 2.7 |
| Iron Oxide ($Fe_2O_3$) | 1.1 | 0.9 | 1.0 |
| Lime (CaO) | 0.1 | 0.05 | 0.03 |
| Magnesia (MgO) | Trace | 0.05 | 0.04 |
| Alkalies | 0.1 | 0.1 | 0.13 |

Any number of bond clays can be used in the practice of this invention. It must be possible, however, to blend these clays so that their combined alkalies are between about 1.9 and 2.3%, by weight, based on a calcined oxide analysis. The chemical analyses of suitable clays are given in Table IV.

TABLE IV.—BOND CLAYS (PERCENT)

| | A | | B | | C | |
|---|---|---|---|---|---|---|
| | Calcined | Crude | Calcined | Crude | Calcined | Crude |
| Silica ($SiO_2$) | 52.0 | 44.8 | 62.4 | 57.0 | 54.6 | 48.4 |
| Alumina ($Al_2O_3$) | 44.9 | 38.7 | 29.4 | 26.8 | 39.2 | 34.7 |
| Titania ($TiO_2$) | 1.6 | 1.4 | 1.5 | 1.4 | 1.7 | 1.5 |
| Iron Oxide ($Fe_2O_3$) | 1.3 | 1.1 | 2.6 | 2.4 | 1.8 | 1.6 |
| Lime (CaO) | 0.1 | 0.1 | 0.2 | 0.2 | 0.5 | 0.4 |
| Magnesia (MgO) | 0.1 | 0.1 | 1.0 | 0.9 | 0.5 | 0.4 |
| Alkalies | 0.3 | 0.3 | 3.1 | 2.8 | 1.7 | 1.5 |
| Loss on ignition | | 13.9 | | 8.7 | | 11.4 |

It is important that brick made according to the teachings of this invention are not fired above about cone 15. Firing above this will result in the formation of a large quantity of glass in the matrix, which tends to make the brick prone to spalling on rapid change in temperatures.

Brick made according to this invention are extremely suitable for lining steelmaking ladles, because of their increased refractoriness, low porosity, and good thermal shock resistance as measured by the panel spalling test. Also, brick made according to this invention have a slight reheat expansion, which is considered desirable.

Having thus described the invention in detail and with sufficient particularity as to enable those skilled in the art to practice it, what is desired to have protected by Letters Patent is set forth in the following claims.

I claim:
1. Fired high alumina refractory shapes made from a batch consisting essentially of 60 to 80%, by weight, calcined high alumina material, analyzing from 55 to 75% $Al_2O_3$, based on an oxide analysis, and 20 to 40% of a finely divided bond clay in which the total $Al_2O_3$ content of the brick exceeds about 50%, by weight, the high alumina material containing less than about 0.2% alkalies and the bond clay containing from about 1.9 to 2.3% alkalies, by weight, based on a calcined oxide analysis.

2. Shapes according to claim 1 in which the high alumina material is selected from the group consisting of calcined bauxitic kaolin, calcined Alabama bauxite, synthetic mullite, and calcined Indian kyanite.

3. Shapes according to claim 1 in which the high alumina material is sized so that 50 to 80% is −4 +65 mesh and 20 to 50% is −65 mesh, and the bond clay is substantially all −65 mesh.

4. Shapes according to claim 1 in which the alkali content of the bond clay is from 2.0 to 2.2%.

5. Shapes according to claim 1 in which the alkali content of the bond clay is typically 2.1%.

References Cited
UNITED STATES PATENTS

| | | | |
|---|---|---|---|
| 3,205,081 | 9/1965 | Miller | 106—65 |
| 3,241,989 | 3/1966 | Wishon et al. | 106—65 |

JAMES E. POER, Primary Examiner

U.S. Cl. X.R.

106—67